C. W. GRAHAM.
PROCESS OF INCLOSING FOOD PRODUCTS.
APPLICATION FILED AUG. 22, 1911.
1,158,044. Patented Oct. 26, 1915.
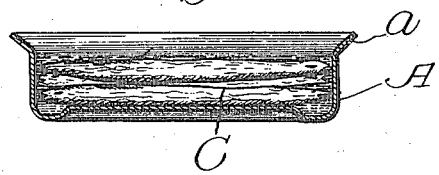
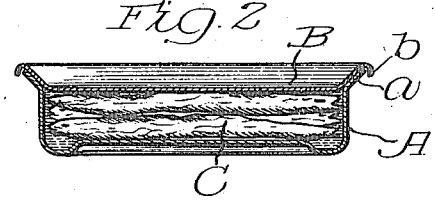
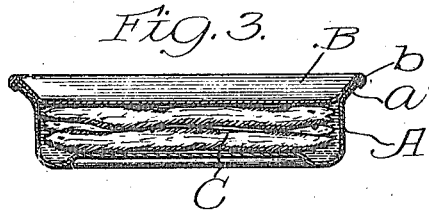
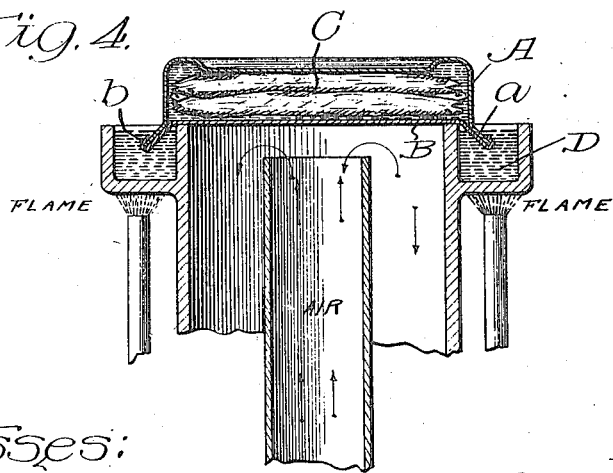
Witnesses:
G. W. Domarus Jr.
W. P. Kilroy
Inventor:
Charles W. Graham
By Munday, Evarts, Adcock & Clarke
Attys.

UNITED STATES PATENT OFFICE.

CHARLES W. GRAHAM, OF NEW YORK, N. Y., ASSIGNOR TO AMERICAN CAN COMPANY, OF NEW YORK, N. Y., A CORPORATION OF NEW JERSEY.

PROCESS OF INCLOSING FOOD PRODUCTS.

1,158,044.

Specification of Letters Patent. Patented Oct. 26, 1915.

Application filed August 22, 1911. Serial No. 645,461.

*To all whom it may concern:*

Be it known that I, CHARLES W. GRAHAM, a citizen of the United States, residing in New York, in the county of New York and State of New York, have invented a new and useful Improvement in Processes of Inclosing Food Products, of which the following is a specification.

This invention relates to a process of hermetically inclosing certain food products in sheet metal vessels. And it consists in packing sardines in oil,—or any other food product containing a liquid admixture such as olive oil or cotton seed oil, that may serve as a suitable flux for a soldered seam,—in a sheet metal vessel or can, to which a sheet metal cover is applied and temporarily united by interfolding with the sheet metal body, and thereafter dipping or immersing the inverted seam in a solder bath so that the oily flux of the contents and the molten solder may approach each other and form a hermetic seam free from pin holes.

In the accompanying drawing which forms a part of this specification, Figure 1 is a sectional view of a suitably flanged sheet metal can or vessel for practising my invention, said vessel being filled with sardines and oil. Fig. 2 is a similar section of the same can and its contents, with a suitably flanged cover loosely applied thereto. Fig. 3 is a similar section, showing the flange of the cover interfolded with the flange of the can body, temporarily uniting the two, ready for the soldering operation. Fig. 4 is a simlar sectional view showing the can body and its cover inverted to bring the seam to the lower position and immersed in a bath of molten solder.

Owing to the tendency of the contents of filled sardine cans to expand, vaporize or gasify under the action of the heat of soldering irons applied to the seam, the hermetic closure of such filled cans by soldered seams has always been a difficult thing to do without special machinery operating to solder the joint, and many different devices have been contrived to accomplish this purpose. In the present invention, I obviate all of these difficulties by taking advantage of the fact that the contents of the can themselves, or the liquid portion of said contents is a most excellent solder flux, and of the further fact that the molten solder is far denser than the oily contents of the can, and at the same time much hotter than said contents can become in a short contact by immersion. In this process, therefore, I fill the can full of the fish and oil, place the cover on and temporarily secure the cover by a folded, tightly compressed joint which will prevent the outward passage of the oil except such passage be accomplished by what is called "weeping"; that is to say, a very slow outward movement, probably induced by capillary attraction. In this condition I invert the can and immerse the folded seam of the inverted can in molten solder, leaving said seam immersed only long enough to insure the sweating of the solder into the crevice of the seam far enough to establish a sound joint, after which the can is taken out, cooled, and the process completed. It is a fact that the presence of the flux in the crevice of the seam to be soldered will tend to draw the solder into said crevice and thus perfect the joint, and advantage is taken of that fact in this process.

In said drawing, A is the can body and $a$ a suitably formed flange on the upper rim of the said body.

B is the cover and $b$ a suitably formed flange on the rim of the cover.

C is the contents of the can, consisting in this case of sardines and oil.

D is the bath of molten solder into which the seam of the inverted can body is immersed.

During the soldering operation the body of the can is subjected to a current of air, as shown in Fig. 4. This is conveniently done by providing a large vertical air pipe E within the solder bath, and having an open upper end over which the under side of the can is applied when its flange is immersed in the bath. Into the pipe E and against the under side of the can a current of air is caused to pass by means of and through a central air pipe F, as indicated by the arrows in Fig. 4, the air escaping down the pipe E.

I claim:—

1. The process of canning food products which consists in inclosing the food product within a can, together with a soldering flux, and then immersing the seam of the can in a bath of molten solder and drawing the solder from said bath into the seam of the can by the aid of said flux within the seam and at the same time subjecting the body of the can to a current of air.

2. The process of canning food products which consists in inclosing the food product within a can, together with a soldering flux, and then immersing the seam of the can in a bath of molten solder and drawing the solder from said bath into the seam of the can by the aid of said flux within the seam, and at the same time applying a cooling medium to the body of the can.

CHARLES W. GRAHAM.

Witnesses:
PEARL ABRAMS,
H. M. MUNDAY.